(12) United States Patent
Weber et al.

(10) Patent No.: US 6,416,800 B1
(45) Date of Patent: Jul. 9, 2002

(54) FIBER OPTIC CANDY

(75) Inventors: Paul J. Weber, Ft. Lauderdale, FL (US); Brian D. Andresen, Livermore, CA (US)

(73) Assignee: Pearl Technology Holdings, LLC, Tampa, FL (US)

( * ) Notice: Subject to any disclaimer, the term of this patent is extended or adjusted under 35 U.S.C. 154(b) by 0 days.

(21) Appl. No.: 09/632,869

(22) Filed: Aug. 4, 2000

(51) Int. Cl.$^7$ ................................................ A23G 1/00
(52) U.S. Cl. ..................... 426/104; 426/91; 426/103; 426/132; 426/134; 362/109
(58) Field of Search ................... 426/134, 104, 426/91, 132, 103; 362/109, 806, 253, 208; 446/71, 386

(56) References Cited

U.S. PATENT DOCUMENTS

| | | | | |
|---|---|---|---|---|
| 1,769,215 A | * | 7/1930 | Firman | 426/91 |
| 4,873,085 A | * | 10/1989 | Fuisz | 424/400 |
| 4,914,748 A | * | 4/1990 | Schlotter, IV et al. | 362/109 |
| 5,066,502 A | * | 11/1991 | Eales | 426/75 |
| 5,209,692 A | | 5/1993 | Coleman et al. | 446/71 |
| 5,324,527 A | * | 6/1994 | Coleman | 426/134 |
| 5,348,758 A | * | 9/1994 | Fuisz et al. | 426/660 |
| 5,471,373 A | | 11/1995 | Coleman et al. | 362/109 |
| 5,545,069 A | * | 8/1996 | Glynn et al. | 446/73 |
| 5,597,416 A | * | 1/1997 | Fuisz et al. | 127/30 |
| 5,615,941 A | | 4/1997 | Shecter | 362/109 |
| 5,676,988 A | | 10/1997 | Coleman et al. | 426/134 |
| 5,733,033 A | | 3/1998 | Coleman et al. | 362/109 |
| 5,860,732 A | | 1/1999 | Coleman et al. | 362/253 |
| 6,050,697 A | * | 4/2000 | Bennington | 362/109 |
| 6,054,156 A | | 4/2000 | Rudell et al. | 426/104 |
| 6,135,606 A | * | 10/2000 | Fernandez et al. | 362/109 |
| 6,221,407 B1 | * | 4/2001 | Gallart et al. | 426/91 |

FOREIGN PATENT DOCUMENTS

| | | | |
|---|---|---|---|
| FR | 2744336 A | * | 8/1997 |
| JP | 405153911 | * | 6/1993 |
| JP | 06225746 A | * | 8/1994 |
| WO | WO200045679 A | * | 2/2001 |

OTHER PUBLICATIONS

Cynthia Graber, "Make edible fiber optics",Scientific Explorations, Spring 2001.*

Emily Costello, "High Tech Glass: Scientists Are Discovering New Uses for Glass in Schools, Computers, and Even Inside the Human Body", Science World, Nov. 15, 1996, vol. 53, No. 6, p. 13–14.*

* cited by examiner

Primary Examiner—Milton I. Cano
Assistant Examiner—Robert Madsen
(74) Attorney, Agent, or Firm—John P. Wooldridge

(57) ABSTRACT

An edible fiberoptic light source is combined with confectioneries, in particular candy, to form a safe edible material possessing unusual combinations of internally generated colors and optical images. The basic design consists of a edible food pipes that may be placed within various confectioneries or foodstuffs that elicits light of various colors and intensities while standing untouched and even as the product is ingested. Digestible optical fibers act as light pipes to carry light into confectioneries where different colors and patterns of light are generated as the candy is reduced in size. Indigestible fiberoptics may see use delivering light energy into areas of digestible fiberoptic or digestible optic carriage. The light source and edible fiber optics not only has uses in candies of all types, especially lollipops and hard candy, but also is suitable for frozen food products (Popsicles), cakes and pies with lettering and decorations that emit light. The candy or other decorated edible may be of liquid, solid or gelatinous form.

25 Claims, 6 Drawing Sheets

FIBER OPTIC CANDY

BACKGROUND OF THE INVENTION

1. Field of the Invention

The present invention relates to the use of light as a food decoration, and more specifically, it relates to the use of light carried by edible fiberoptics as a decoration in confections and in food products.

2. Description of Related Art

The consumption of sugar-based confectioneries dates back 3,000 years to the Egyptians. Roman craftsmen were skilled in making and molding confectioneries using honey, fruits, herbs and spices. In the Middle Ages, Persians developed sugarcane cultivation and the Venetians exported sugarcane to many urban centers. In the 16$^{th}$ century, European confectioners were manufacturing a variety of candies in fanciful forms by handcrafted methods. In the late 18$^{th}$ century, mechanical processing of candy began. Today many hundreds of millions of pounds of candy are produced and consumed annually.

Candy can be formed into a multitude of shapes, colors, flavors, sizes and textures. Candies can be divided into crystalline and non-crystalline types. Crystalline candies can be hard, smooth and/or creamy with a defined structure containing small crystals. Non-crystalline candies, such as toffees, brittles, and caramels, are chewy with a homogeneous structure. These types of candies are formed by the addition of milk or other protein products to solutions of sugars at elevated temperatures.

Hard Candy

When solutions of mixed sugars are boiled, they can be concentrated into a plastic mass that can be flavored, colored, and formed into shapes while hardening. Once allowed to cool, this type of candy forms an organic "glass" that is the basis of various hard candies. To prepare this type of candy, mixed sugars and water are boiled until the solution reaches a high sugar level that becomes supersaturated. Upon rapid cooling, the solution becomes a hard, transparent glassy mass that may contain as little as 2% water.

High temperature solutions of sugars are unstable and will readily crystallize unless preventative steps are employed. Small amounts of complex carbohydrates and corn syrup, when added to the stock solution, increase solubilities and viscosities while reducing crystallization. The ratio of corn syrup to sugar controls the hardness and texture of the candy. In contrast, "rock candy" is generated when pure, saturated sugar solutions are allowed to crystallize slowly.

Gum Arabic

Some candies are formed from the extract of the acacia tree. The semi-clear gum-material can be mixed with other sugars or starches to generate a variety of candy types. Gelatin and agar are often substituted for gum arabic in many candy processes.

Cotton Candy

Cotton floss or cotton candy is a special type of candy. Sugar is heated to its melting point and simultaneously spun at high speeds in a specialized centrifuge cup. The cup possesses fine holes that allow the melted sugar to be spun outward where it cools and forms fine strands of glassy sugar. Dyes can be added to the initial mixture forming the well-recognized pink and blue cotton candy balls, which are traditionally placed at the end of a paper stick.

Miscellaneous Candies

There are a variety of other candy types that are commercially available. Some include fudge, nougat, marshmallow, truffles, licorice, gum, candy coated foods products and other confectioneries (including cakes and frozen products). Because of the many variables involved in the preparation of the candy, a great many types of confectionery products can be manufactured.

Prior to their selection and consumption, candy products are presented in a variety of forms to entice the consumer. Manufacturers can generate interest in the product by designing candy with unique shapes, colors, aromas and packaging designs. The pleasing or interesting appearance of the confectionery often causes one product to be selected over another.

It is desirable to provide methods to enhance the appearance and desirability of all confectionery products using light sources that generate pleasing, interesting and unusual optical colors and images in confectioneries.

SUMMARY OF THE INVENTION

It is an object of the present invention to provide a means and method for transmitting light into various edible or even inedible articles from a light source operatively connected to an edible fiberoptic.

Another object of the invention is to provide an edible fiberoptic that includes scattering effects and "leakiness" along the edible fiberoptic such that pleasing light events may be noticed.

Still another object of the invention is to maintain the integrity of an edible-fiberoptic and edible-cladding unit such that manipulation of a warm or cold or temperature-neutral confectionery (either in solution, liquid, gel or solid form) external to the unit does not compromise the edible fiberoptic and edible cladding unit.

It is a further object of the invention to provide a very accommodating (malleable) means to decorate many edible items including candy, cakes, dinners, fruits, vegetables to make them more interesting and appealing using edible, flavor-matched, saliva dissolvability matched, texture-matched materials that are biocompatible and may either be edible yet digestible (sugars, proteins, sugar-proteins, DNA, RNA, etc) or edible yet indigestible (celluloses, psyllium).

It is a further object to make the fiberoptics adaptable to various light sources.

It is a further object to make the edible fiberoptics capable of creating further effects by piping them into various structures capable of luminous displays such that the light effect is pleasing such as the motion of a bear inside of a lollipop.

Additional objects of the invention will be apparent to those skilled in the art based on the teachings of the present invention.

The invention provides methods and apparatuses that enhance the appearance and desirability of confectionery products using unique light sources that generate pleasing, interesting and unusual optical colors and images in confectioneries and prepared foodstuffs. The essential idea is that candies and foodstuffs can contain specially designed edible or digestive system-compatible fiberoptics to channel an external or internal light source into the edible portion of the confectionery. The light can be generated from sunlight, incandescent, light emitting diode (LED) sources and other light sources. In some of the various embodiments, as the product is consumed, different portions will change color and intensity. This new configuration of light and confectioneries forms an unusual and edible material.

In one embodiment, a rigid light pipe is made from a semi-clear sugar mixture that sits atop a light emitting diode (LED) or incandescent lamp. The light is carried through or into a candy (e.g., ball-shaped like a lollipop) containing the edible fiberoptic, which may even contain layered colored food dyes. Another embodiment of the invention includes a battery power source for a light source that provides light to a fiber optic bundle held in place with a plastic wrapper that may be spiral and removable. The fiber optics from the bundle fan out to terminate at various points within the candy piece.

In another embodiment, a frozen confection generates unusual colors as it is reduced in size while being eaten. A bundle of edible fiber optics is operatively connected to receive light from the light source and deliver light to various points within the frozen item. Another embodiment has a single edible fiber optic traversing the length of an edible hollow translucent material. The fiber optic may be provided with cuts or abrasions along its length to provide an exit point for light to illuminate the frozen confection. Many other embodiments of the invention are presented.

In the present invention, the term "edible" means safe or fit to be eaten. The term "digestible" means to transform into an assimilable state.

DETAILED DESCRIPTION OF THE INVENTION

Figure 1:
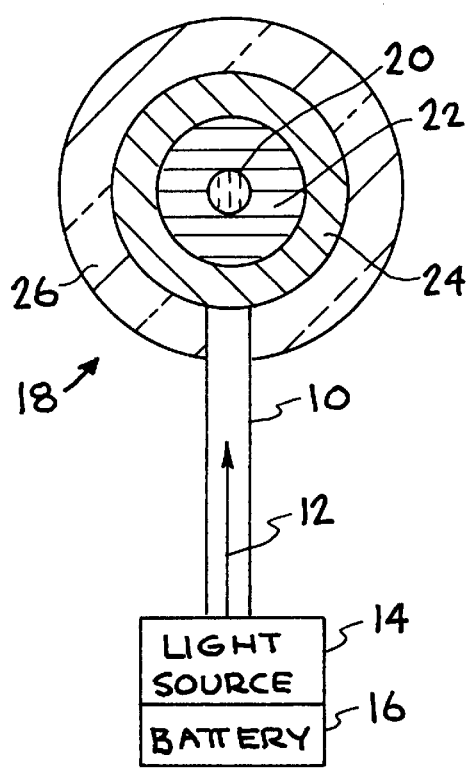
FIG. 1 shows an embodiment of the invention that includes a hollow stem through which light from a light source that is powered by a battery may propagate.

In one embodiment, a rigid light pipe is made from a semi-clear sugar mixture that sits atop a light emitting diode (LED) or incandescent lamp. The light is carried through or into a candy (e.g., ball-shaped like a lollipop) containing the edible fiberoptic, which may even contain layered colored food dyes. Optical excitation of the dyes causes the candy "sucker" to glow. As the ball (spheroid-shaped or polyhedral-shaped foodstuff) is reduced in size, the ball can change colors due to different layers of food dyes. Additional candy balls of varying sizes can be added atop the digestible fiber optic stick and the process repeated. Referring to FIG. 1, one embodiment of the invention includes a hollow stem 10 through which light 12 from a light source 14 powered by a battery 16 may propagate. The light may travel through the hollow stem itself, reflecting from inner reflecting walls, or may travel in a plurality of fiber optics that are optically connected to receive light from the light source. The stem is operatively connected to the candy piece 18 fixed at the end of the stem such that light will propagate from the light source, through the stem 10 and into the candy piece 18. The candy piece may include layers of candy where each layer comprises a color. In the figure, the candy piece is configured as a ball having three layers, where a yellow center 20 is surrounded by a blue layer 22, within a green layer 24 within an outer clear layer 26.

Figure 2:
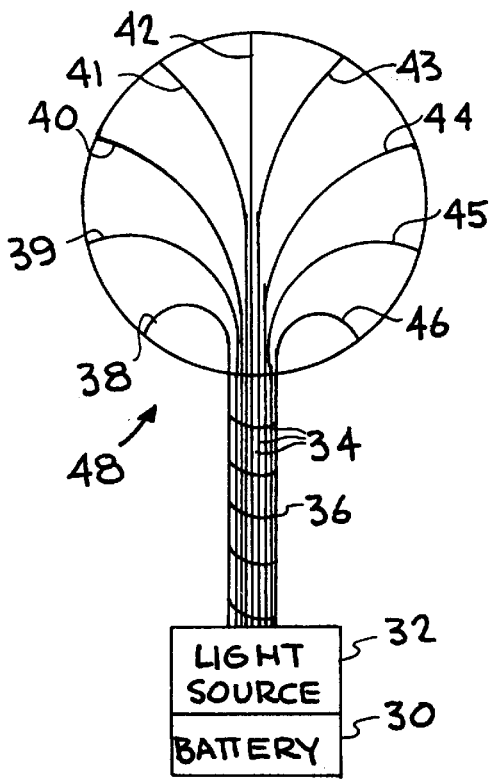
FIG. 2 shows another embodiment of the invention and includes a battery power source for a light source.

FIG. 2 shows another embodiment of the invention and includes a battery power source 30 for light source 32. A fiber optic bundle 34 is held in place with a plastic wrapper 36 that may be spiral and removable. The fiber optics from the bundle fan out to terminate at various points 38–45 within the candy piece 48. Some digestible fiber optics usable in the present invention are disclosed U.S. patent application Ser. No. 09/568,796 titled "Biodegradable Fiber Optic", incorporated herein by reference.

Figure 3:
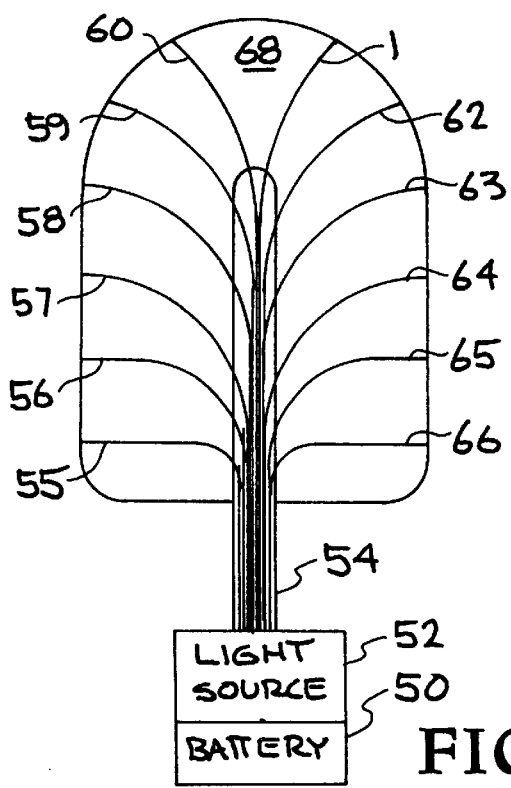
FIG. 3 shows a frozen confection that includes a battery power source for a light source.
Figure 4:
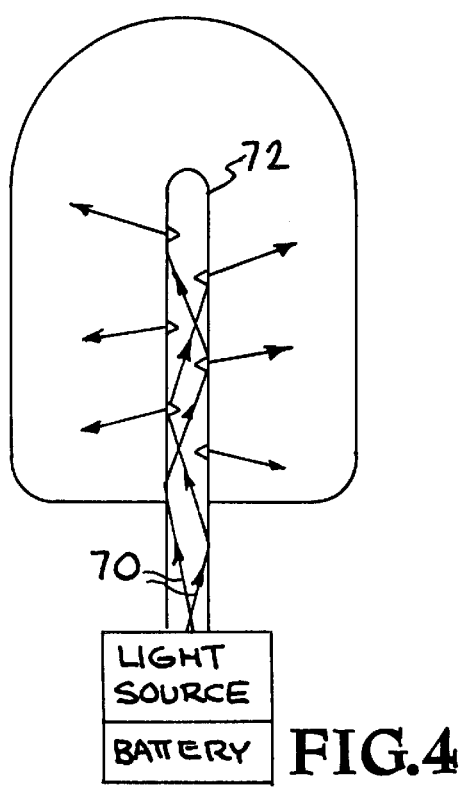
FIG. 4 illustrates an embodiment having a single edible fiber optic traversing the length of an edible hollow translucent material.

In another embodiment, a frozen confection can also generate unusual colors as it is reduced in size while being eaten. FIG. 3 shows such a confection and includes a battery power source 50 for light source 52. A bundle, 54 of edible fiber optics are operatively but possible release-ably connected to receive light from the light source and deliver light to various points (e.g., points 55–66) within the frozen item 68. The edible fiber optics may be bound together in a bundle through a tube, may be adhered together with a binding material such as wax as discussed below or may be wrapped with a plastic wrapper that may be completely encircling or spirally removed. FIG. 4 illustrates another embodiment having a single edible fiber optic 70 traversing the length of an edible hollow translucent material 72. The fiber optic may be provided with cuts or abrasions along its length to provide an exit point for light to illuminate the frozen confection.

Figure 6:
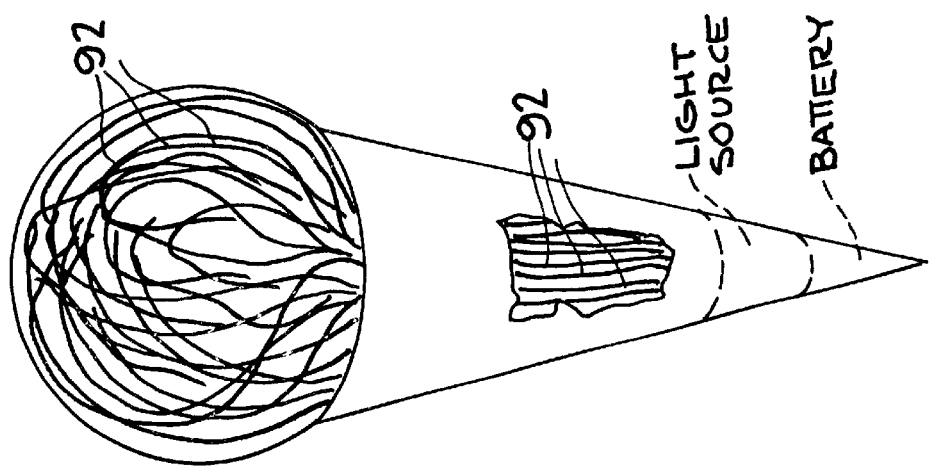
FIG. 6 shows ball of candy formed by strands of edible fiber optics.
Figure 5:
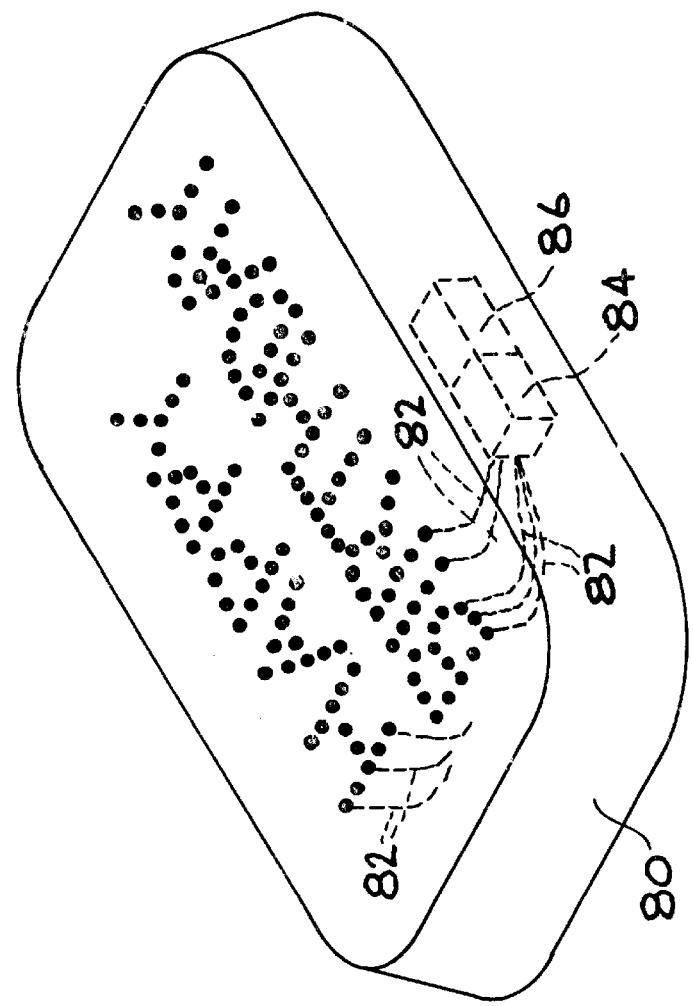
FIG. 5 shows a cake with embedded fiber optics lighted by a light source powered by a battery.

Edible fiber optics can be placed as lettering on cakes, pies or various other frozen food products. FIG. 5 shows a cake 80 with embedded fiber optics 82 lighted by a light source 84 powered by a battery 86. The fiber optics, in this example, are terminated on the top side of the cake to provide a display that says "Happy Birthday". FIG. 6 shows ball of strands of edible fiber optics that are made to change color and shape as the contained fiberoptics 92 are exposed to variable colorations of diodes either by selective light source firing or movement over the light sources. Additionally, the candy may be moved or rotated while eating to further alter the viewing angle and appreciation.

Fiber Optic Candy and Light Conduction

Fiber optics operate based on total internal reflection of light rays traveling through optical pathways. The fibers are so small that once the light is introduced into the fiber with an angle within the confines of the numerical aperture of the fiber, it will continue to reflect, with very little loss, off the walls of the fiber. This enables low light input to the fiber to travel long distances with little loss. Bundles of such fibers can also accomplish imaging of objects at a distance.

The key principal for a successful fiber optic confectionery is to maintain a lower index of refraction covering over a high index core material. The index of refraction of air is approximately 1.0. In pure form, fiber optics made of sugar would easily transmit light in the air. When wetted with saliva or water (index of refraction~1.33), the light can still propagate through hard candy (index of refraction~1.50.) Coating of less dense confectionery with different index of refraction candies allows the brightness of the transmitted light to be modulated as the confectionery is slowly dissolved. This dissolution process can allow different images to appear inside the candy.

An example in its simplest form would be a very dense sugar-gum candy covered with a thin coating of a less dense sugar to maintain an edible fiber optic confectionery. In fact any semi-transparent food material covering a high-density food material could be successfully utilized to transmit light. A strand of sugar coated with a light coating of oil serves as a very usable edible fiber optic. The index of refraction of the oils, as shown below in Table 1, could be adjusted up or down by adding dopants of materials, such as other oils, having either a greater or lesser index of refraction than the host oil.

Gastrointestinal surgeons could use disposable edible fiber optics to send smooth disposable cameras or acid detectors or other things into the gastrointestinal tract to enable real time observation and instead of pulling the fiber optics out causing irritation, surgeons could just let the digestible item pass through the stool.

The following index of refraction data reveal an average of three measurements at 20° C. for some confectionery coatings utilizing incandescent light Variations in the data possibly indicate water content and batch-to-batch variations in the available confectionery coatings. If hard candy (with index of refraction 1.5 or greater) were coated with any of the following, an optically illuminated confectionery could be generated. The lower index of refraction values of the coating materials enhance the light pipe effect in the candy and confectionery.

TABLE 1

| Edible Coating | Index of Refraction |
| --- | --- |
| Paraffin oils (light wax coatings) | 1.332–1.412 |
| Polyunsaturated oils | 1.371–1.432 |
| Linseed oil | 1.479–1.480 |
| Sunflower oil | 1.474–1.475 |
| Soybean oil | 1.471–1.475 |
| Corn oil | 1.474–1.476 |
| Cottonseed oil | 1.472–1.477 |
| Sesame oil | 1.473–1.476 |
| Rapeseed oil | 1.472–1.476 |
| Saccharin oil | 1.471–1.474 |
| Soy sauce oil | 1.471–1.474 |

TABLE 1-continued

| Edible Coating | Index of Refraction |
| --- | --- |
| Peanut oil | 1.46–1.4720 |
| Olive oil | 1.467–1.471 |
| Almond oil | 1.470–1.471 |
| Castor oil | 1.477–1.479 |
| Coconut oil | 1.448–1.450 |
| Palm oil | 1.455–1.456 |
| Vegetable wax (bees wax) | 1.457–1.459 |
| Beef-Tallow | 1.454–1.459 |
| Sardine oil | 1.479–1.481 |
| Cod-liver oil | 1.477–1.483 |
| Beef fat | 1.457–1.459 |
| Commercial lard | 1.460–1.461 |
| Margarine (butter) | 1.453–1.463 |

It is interesting to note that most edible oils and waxes possess an index of refraction of 1.33–1.48. This is well below that of hard candy and other confectioneries, making waxes and oils an ideal coating for confectioneries. In addition, sugar solutions at 80% in water possess an index of refraction of 1.490. Thus, the present invention includes embodiments having liquids or frozen food products containing at least 80% sugar, coated with any edible oils or wax coating to serve as an ideal light pipe for various optically unique edible food products. The use of a cladding having an index of refraction approaching that of the core produces a lossier core, allowing the fiber illumination to escape the core and to serve as a decoration over the length of the fiber.

Sodium chloride possesses an index of refraction of 1.53–1.64 depending upon its crystalline structure. When coated with sugar products this material can also serve as a light pipe for unique food products.

Examples of Optically Excited Confectioneries

Figure 8:
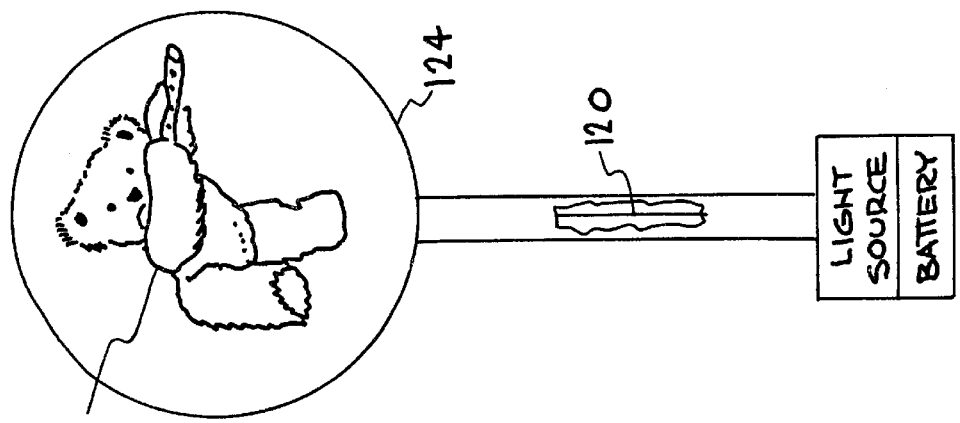
FIG. 8 shows an edible or inedible fiberoptic source that is terminated in a target or image that simulates a hologram contained within the candy.
Figure 7B:
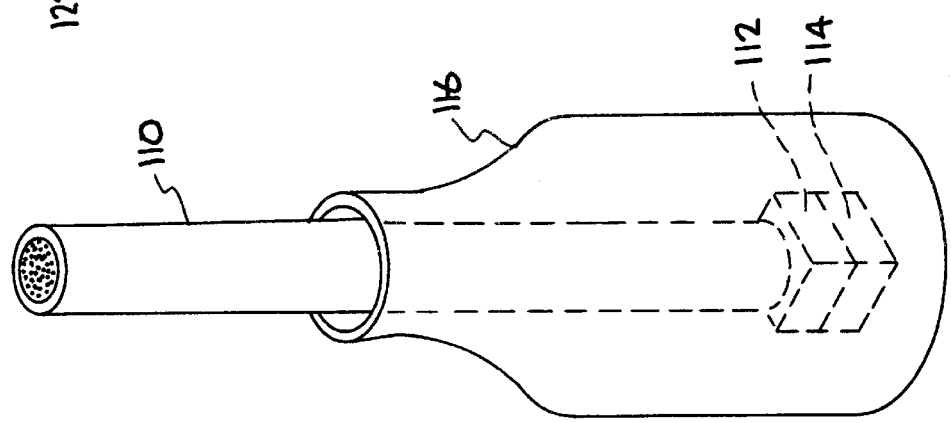
FIG. 7B shows a tubular support sheath within which a fiber optic bundle is placed or that has an inner reflecting surface.
Figure 7A:
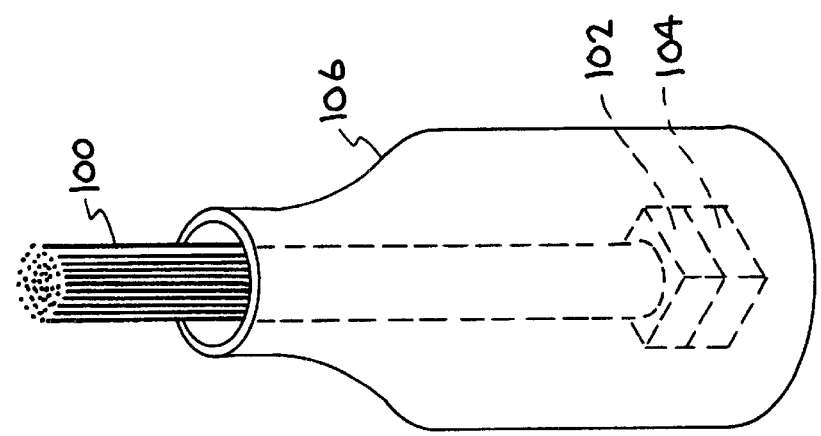
FIG. 7A shows a fiber optic bundle attached to a light source and powered by a battery all within an enclosure used as a lollipop holder.
Figure 9:
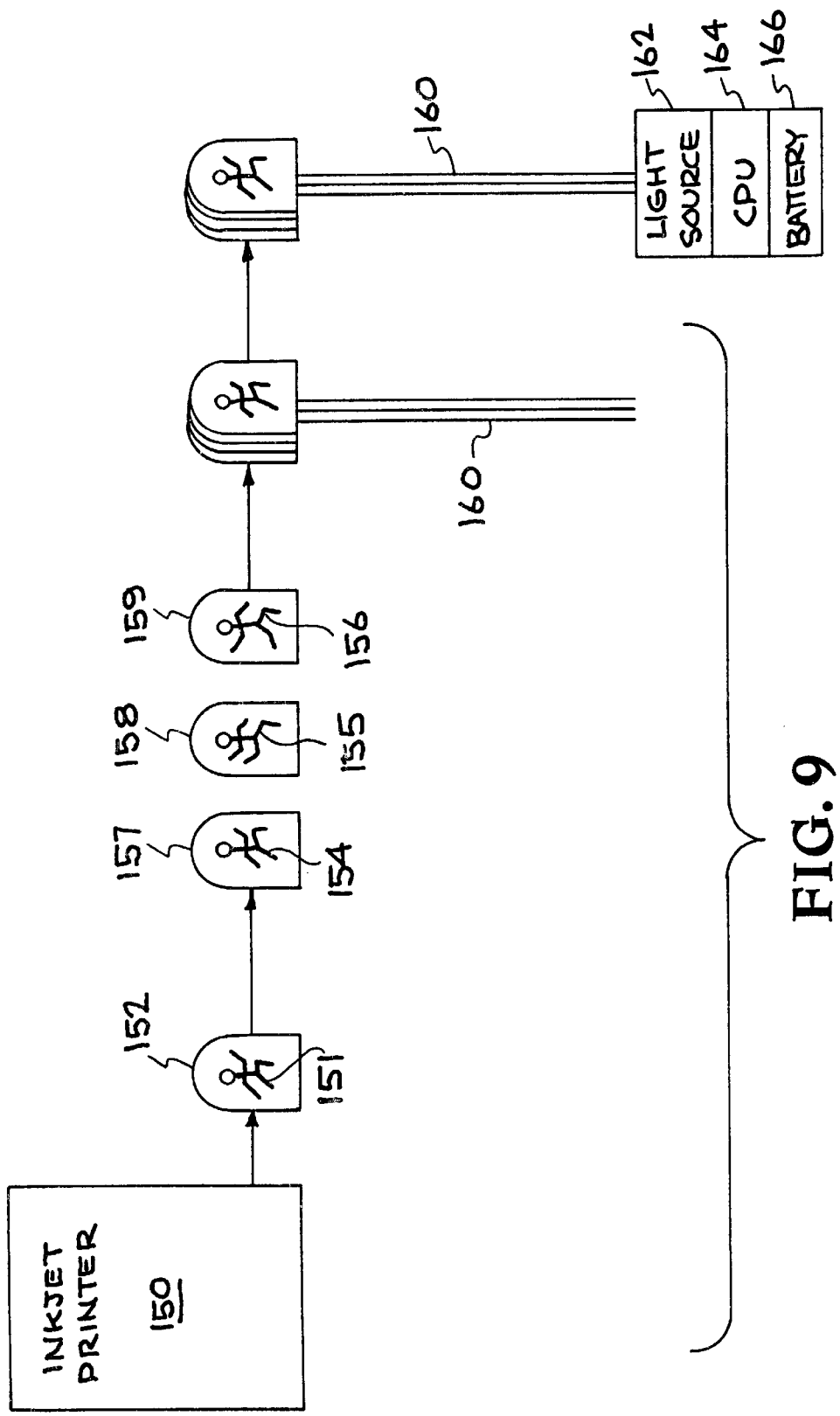
FIG. 9 illustrates a process for making a series fusiform cross sectional sugar solids that together will appear to move when the image within each solid is illuminated sequentially with respect to the other images.

FIG. 7A shows a fiber optic bundle 100 attached to a light source 102 powered by a battery 104 all within an enclosure 106 used as a lollipop holder. FIG. 7B shows a tubular support sheaf 110 within which a fiber optic bundle is placed or that has an inner reflecting surface. The sheaf 110 is connected to the light source 112 and battery 114 all within an enclosure 116. FIG. 8 shows the edible or inedible fiberoptic 120 source terminated in a target or image 122 simulating a hologram contained within the candy 124. A target image encased in lollipop could for example be a fusiform cross sectional sugar solid that has been inkjet decorated with a method such as in Weber et al. (U.S. Pat. No. 6,067,996 titled "Nail Decoration Using Ink Jets") wherein a fingernail ink-jet decorating machine is used to paint a precise image upon the target sugar solid. The painted sugar solid is placed atop the lollipop stick and coated with a clear thin coat of a "protective" (just temporarily while the rest of the lollipop sugar is allowed to solidify entrapping it) barrier. The rest of the lollipop is formed around the central painted sugar solid. It is easiest to ink a fusiform relatively flat image using the fingernail printer because an appropriate target well can be fitted. A light energy source may be placed in lollipop spinning devices and the light may pass up a fiberoptic (edible or inedible) lollipop stick. Different colored diodes may be used to provide an array of colors. This plan can work as well for Popsicles. FIG. 9 illustrates a process for making a series fusiform cross sectional sugar solids that together will appear to move when the image within each solid is illuminated sequentially with respect to the other images. An inkjet printer 150 prints an image 151 onto a sugar solid 152. A series of these images may be produced, (e.g., images 154–156 in solids 157–159). A fiber optic connected to each image provides illumination. The system will provide the appearance of motion if the images 154–156 within the sugar solids 157–159 are overlaid and each image is illuminated by a fiber optic 160 connected to a light source 162. The light sources are controlled by a CPU 164 and the system components are powered by a battery 166.

Alternately, the candy may contain a target to be lit within the lollipop that is formed by laser cutting deep within the candy. Alternatively, an edible liquid light carriage may be placed within an edible or inedible hollow cylindrical or geometric stick for light conduction as long as the refractive indices are appropriately different.

The previously patented lollipop spinning base (U.S. Pat. No. 5,209,692 titled "Combination, A Novelty Toy And A Candy Holding Device" incorporated herein by reference) (LSB herein) may contain a diode light source that can illuminate the base of numerous (hundreds) of small diameter fiberoptics when fitted appropriately. These fiberoptics may travel bound or unbound within an optically transparent or non-transparent edible or inedible external stick sheath. Upon passing into the lollipop, the edible fiberoptic bundles may be unwound to form a spray of minute edible fiberoptics within the remainder of the spheroidal, cylindrical or geometric-shaped lollipop. The fiberoptics may be colored to reveal different colors as the pop is sucked. It is preferable that the rate of dissolvability between the fiberoptics and the lollipop proper be equivalent or greater so as not to end up with an unpleasantly hairy or spiny lollipop due to protruding edible fiberoptics. However some people may find a hairy or spiny lollipop desirable. Additionally, the fiberoptic or light carriage optics (not necessarily a fiber) may constitute the entire lollipop with very little filler holding the edible fiberoptic strand(s) together.

The strands of fiberoptic can be made to be "leaky" to light. The fiberoptics can be made with cuts along its length at locations where light would be desired to exit the fiber. If the index of refraction of the core is made small, the core will guide less of the light. The bend ratio of the fiber could be utilized such that the fiber is bent to a degree that causes light to escape the core. The lossyness of a fiber can be enhanced by sucking, chewing or eating which causes enhanced color and brightness.

Energy sources for the present invention will likely be from batteries such as can be placed in the LSB or elsewhere or may be natural (e.g., lemon batteries or zinc). Light sources can be from light emitting diodes, incandescent lamps, or thin-film organic polymer light sources.

Figure 10:
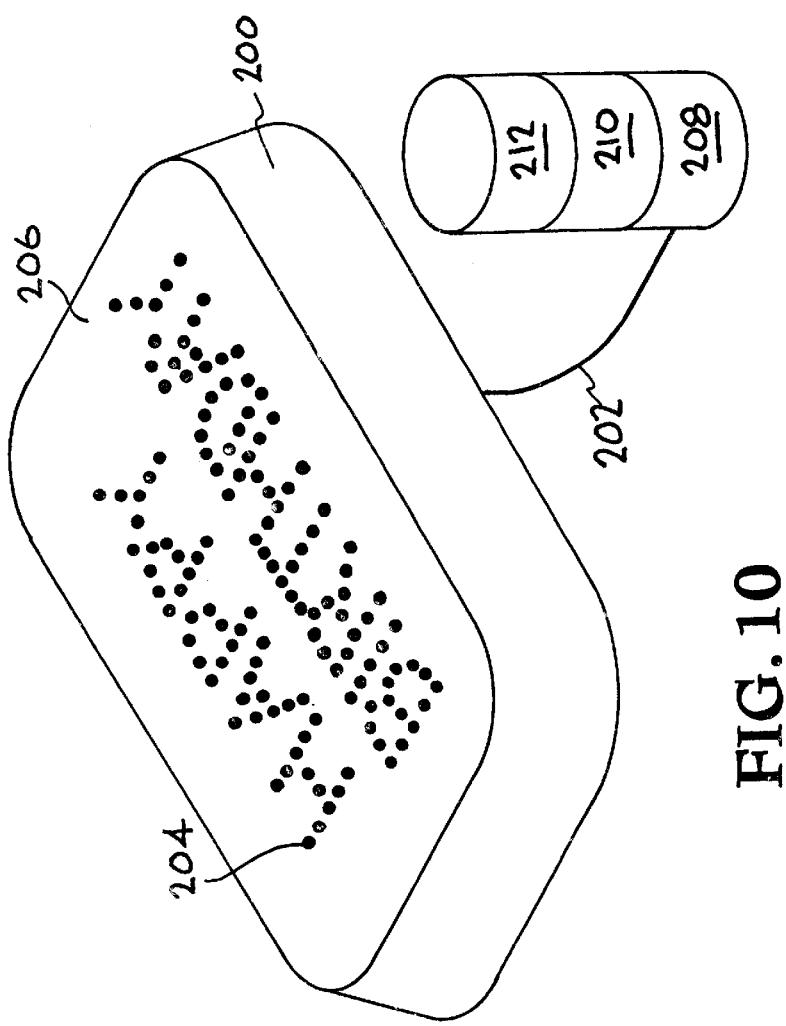
FIG. 10 illustrates a food product such as a cake or candy that has an array of fiber optic terminations at the cake surface.

Computer microchips may be interposed in the scheme to program a light show or illumination within fiberoptic candy or cakes and may control light emanation at the diode level or by some other gating means. FIG. 10 illustrates a food product 200 such as a cake or candy that has an array of fiber optic 202 terminations 204 at the cake surface 206. The fiber optics 202 are illuminated by a light source 208, powered by a battery 210 and controlled by a CPU 212.

Figure 11:
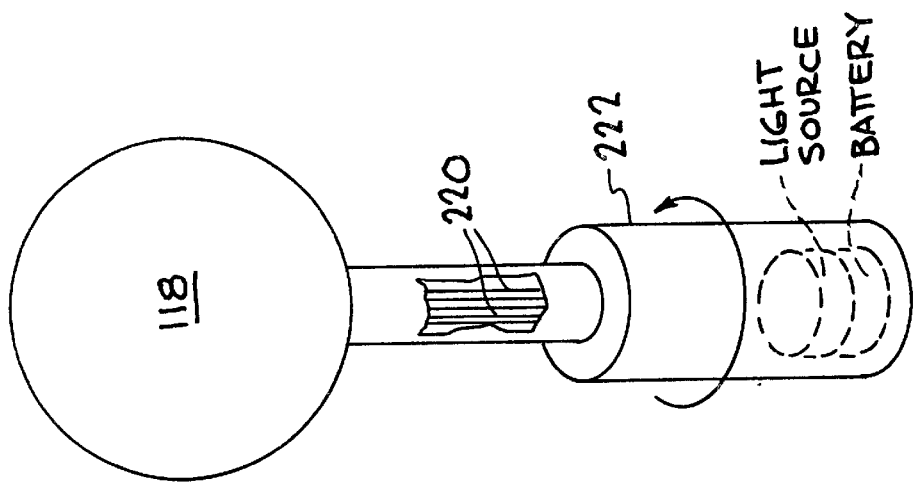
FIG. 11 shows multiple small laminates decorated with an inkjet fingernail decorator.

Multiple clear or translucent sugar (edible) flat laminates (e.g., 1.5×1 cm in size) may be printed upon using an inkjet printer with an image as described in FIG. 9 above. Just like the old trick kids do in grade school of drawing stick figures in slightly different positions and flipping the edges of the paper, the drawings are on the image may be "seen to move." Referring now to FIG. 11, multiple (e.g., 3) small laminates may be decorated in the inkjet fingernail decorator or on a sheet in an inkjet printer with some kind of edible inkjet as is now done for cake surface decorating. The images within the candy portion 118 are slightly different and are each hooked up to differing fiberoptics 220 emanating from the spinning lollipop base 222 and illuminated by a device such as can be hidden in a spinning base. As a different fiberoptic leading to a different printed laminate is illuminated in varying sequence the images in the center of the lollipop may be seen to move.

Figure 12:
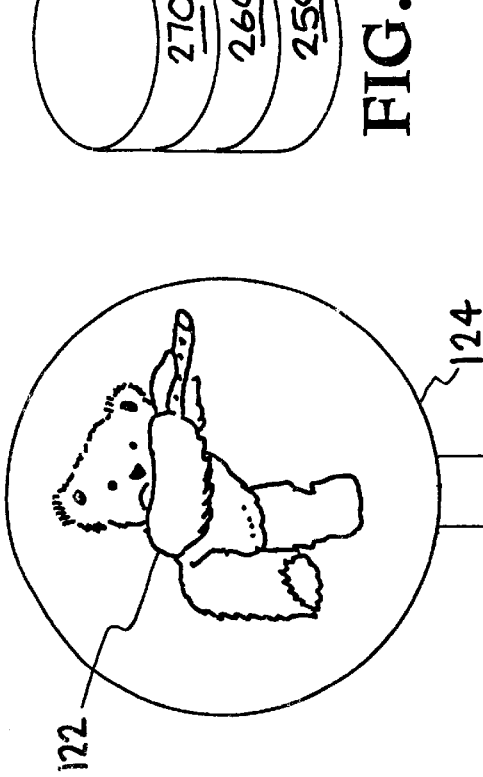
FIG. 12 shows an illuminated bear internal to a candy.

More pseudoholographically, a 3-dimensional candy (preferably) or plastic structure such as a bear say 1.5 cm tall may be placed within a 3 dimensional lollipop and lit by fiberoptics passing through the lollipop stick. The bear can be lit by different colors energized from a light source such as in a rotating base 121 as shown in FIG. 12.

Figure 13:
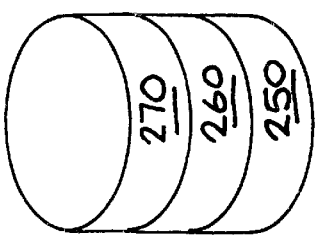
FIG. 13 shows small batteries used to power a microchip coordinated LED or OLED.
Figure 14:
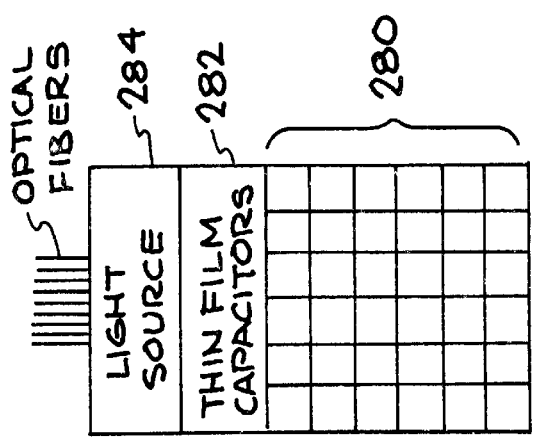
FIG. 14 shows thin film solar cells used for energy storage in the present invention.

As shown in FIG. 13, small batteries 250 may be used to cheaply power microchip 260 coordinated LED's or OLED's 270. These may be unified with the candy or part of a separate mechanism like the prior art rotating lollipop base. Alternately, thin film solar cells 280 can store energy in thin film capacitors 282 to energize LED's or OLED's 284 as shown in FIG. 14.

Figure 15:
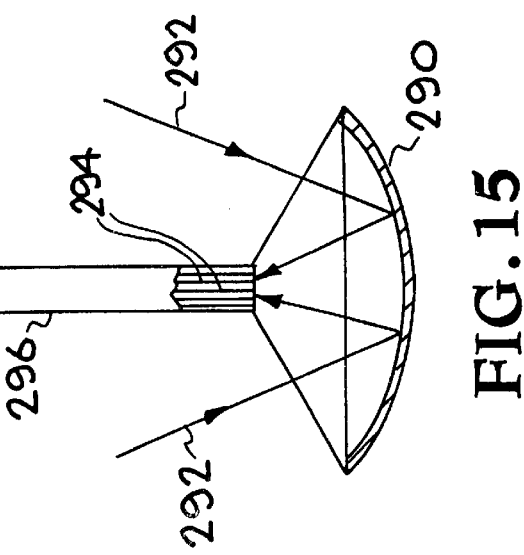
FIG. 15 shows a light gathering mechanism such as a concave mirror for collecting and focusing light rays into the fiberoptics within stem.

FIG. 15 shows a light gathering mechanism such as a concave mirror 290 can catch light rays 292 and focus them into the fiberoptics 294 within stem 296 thus producing light in high enough intensity (to be noticed) in minute beautiful areas in the subject candy 298 even when outside in apparently strong light In another alternate, chemical or thermal reactions may directly by photochemical reaction or by electrical production (zinc and oxygen) energize a capacitor or fiberoptic light source directly. In still another alternate, microcrystals or crystals of compounds such as cholesterol maybe added to the candy or optics to modify the coloration or viewability of the candy thus making a more beautiful appearance.

A variety of materials can be utilized to either form the core or cladding of the edible fiber optic. These would include:

a) Waxes of all types that include straight- and branched-chained saturated and unsaturated hydrocarbons and hydrocarbon alcohols, in pure and mixed chemical compositions can be utilized for the cladding. [It is known in the food industry that apples are dipped into medium molecular weight wax to improve the color and durability of the apple for sale.]

b) High and low molecular weight carbohydrates in either pure form or as mixtures that provide differing degrees of hardness associated with different confectioneries. Monosaccharides—glucose, fructose, arabinose, xylose, etc., the first type of core materials can utilized. Disaccharides (e.g., maltose, cellobiose, lactose, sucrose (table sugar), etc.) are additional examples. Polysaccharides (e.g., starch, amylose, amylopectin, glycogen, cellulose, etc.) can also be utilized to generate either a cladding or clear core of edible fiber optic material.

c) Certain mucopolysaccharides (amino containing saccharides) are also clear and can be packaged into a tube that conducts light of different colors.

d) Recipes:
  i) Example of one embodiment of a stock fiber core material—small scale productions: A volume of 2.5 parts granulated sugar, 0.5 parts light corn oil, 0.5 parts distilled water are placed in a stainless-steel or glass container with mechanical stirrer. The mixture is heated at 125 degrees Centigrade until completely mixed into a clear, viscous material (0.05 parts vinegar can also be added at this point to aid in the processing of the optical candy core material. The addition of small amounts of acid can depolymerize polysaccharides and directs the hardness of the final product). As the temperature is maintained, the water is partially refluxed away. Heating is maintained to reach the degree of candy-core hardness desired (determined by cooling a small portion of the mixture and performing hardness and solubility testing on the candy mixture). The candy mixture is then partially cooled, coloring agents added and stirred (if a uniform color is required). Upon further cooling of the stock core material (to a temperature dependent upon process size, product desired, and automation capabilities, etc.) the stock mixture is then directed under mild pressure through an orifice or spinnerets. Upon air cooling a clear (or dyed) optical rod is generated of any size from microns to inches in diameter. A single rod or combinations of candy fibers are thus generated as an edible optical fiber optic for a variety of end products previously described herein. The candy core material then can be utilized in pure form or covered with a wax or vegetable oil to protect it from moisture in the final product.

ii) Example of one embodiment of candy lollipop with optically illuminated image: A volume of 1.33 parts granulated sugar, two parts light corn oil, and 0.25 parts food coloring (0.10 mg/ml) are added to a stainless steel container and heated to 150 degrees Centigrade until the sugar dissolved to a clear and colored syrup. This lollipop material is stirred while 10 mg/unit volume of cinnamon oil is added. The prepared liquid syrup is removed from the heat and allowed to cool to 120 degrees Centigrade. The temperature is maintained at 112–130 degrees depending upon the stiffness of the batch and type of lollipop desired. A second similar batch of viscous candy syrup is also prepared, however, it is composed of either a different sugar (e.g., maltose) or different corn oil (e.g., heavy vegetable oil). A cool fiber optic rod is obtained and plunged into the first thick lollipop candy syrup. When quickly withdrawn an appreciatable amount of thick candy remains on the end of the edible fiber optic rod that will assume the shape of a ball when turned to allow gravity to fold and round the candy ball. (Alternately, an automated process would mold inject the viscous candy stock under pressure around the stem of the optical candy fiber rod.) When partially cooled to an acceptable degree of hardness an impression of an image is pressed into the semi-hard candy ball. The ball is then reintroduced into the second colored and flavored stock candy liquid for an overcoat of additional candy. The process is repeated between the two (or as many as feasible) stock candy syrup materials until a pleasant-sized ball of candy is generated on the end of an edible optical candy fiber. When light is passed up the fiber rod, light will illuminate the candy ball and additionally reveal hidden images. The unique aspect of the process is to alternate the candy dipping to generated layers of candy of slightly different indices of refractions (as generated using different batches of syrup sugars and oils). This will allow the images pressed into the ball to refract the light, generating different hidden images inside the candy ball. As the lollipop is licked to smaller and smaller sizes, the color and images of the candy ball will also chance in a pleasant manner. The entire process is also suitable for automatic injection-mold candy production. Additional images can be painted or printed on the candy ball between layering with edible food colors. Laser ablation can carve out an image in the candy, or be focused to engrave an image inside the candy. A simple light and small battery are then attached to the bottom of the optical fiber rod. The final candy product can be wrapped in paper, plastic or other suitable packaging materials. Many different candy recipes are available and this is only one embodiment to reveal interesting techniques for optically illuminated candies and confectioneries.

iii) Candy cook temperatures: The amount of candy-hardness desired can be controlled during the heating process (to drive off water or polymerize cooking oil). The consistencies of the stock material can be tested with a simple cold water drop test. A small 1 gram sample of the heated candy syrup is allowed to drop into 10 inches of cold water. The shape of the cooled candy points to the consistency of the stock material. Fifteen minute heating cycles at the following temperatures generates the following data:

| | |
|---|---|
| 110–112 degrees centigrade | Threads (2 inch candy threads) |
| 112–115 degrees centigrade | Soft-ball (candy that can be shaped into a ball that flattens when removed from water) |
| 118–120 degrees centigrade | Firm-ball (candy syrup that can be shaped into a ball that does not flattten) |
| 121–130 degrees centigrade | Hard-ball (candy syrup forms a hard, but pliable ball) |
| 132–443 degrees centigrade | Soft-Crack (candy syrup forms threads that are not hard or brittle) |
| 149–154 degrees centigrade | Hard-Crack (candy syrup separates into brittle threads) |

Light Sources

Some of the light sources usable in the present invention include light emitting diodes of all sizes, colors, and shapes that fit into the handle of the candy. Incandescent light bulbs will also work for short duration illumination of the candy image. In very special cases a burning, bright sparkler can be utilized to provide light to the edible fiber optic. Sunlight can be utilized for illumination of the candy images as the candy sucker is slowly dissolved to reveal different images. In large cakes, fluorescent lights can be the source to the edible fibers optics.

Many types and sizes of batteries are usable in the present invention. For example a hand held confectionery can utilize a small watch battery, while a cake could utilize a D-cell battery. There are many possible combinations that could be utilized for a power source. Attachment of the battery supply to the light source can be performed with any size wire, or silver-plated metal on the confectionery. Silver is not harmful when ingested and would be an ideal means to provide electrical attachments to the light source.

A wide variety of foods may utilize the edible fiber optics of the present invention. Frozen Popsicles are clear and would be a food suitable for fiber optic illumination. Many types of sugar water drinks and ice cream (in a frozen-water form) can carry light easily and hence provide a suitable material for an optically illuminated food. Cakes can have decorations illuminated with an edible optical path that leads back to a light source. All clear candies, clear pasta-type foods, jellos, fruits and vegetables that have a clear core (e.g., watermelon, grapefruit, iceberg lettuce, etc.) are excellent candidates for this new optically illuminated food-stuff. Eyes of fish are often eaten either cooked or raw. Illumination of the eyes provides a very unique food for consumers. Finally, food and drink that may be translucent (e.g., albumin, yogurt, milk, fruit juices, and alcoholic beverages) are also candidates for illumination with edible fiber optics of the present invention.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

We claim:

1. A food product, comprising:
   a light source;
   a power source operatively connected to said light source to provide power thereto;
   an edible article; and
   at least one edible fiber optic embedded within said edible article and operatively connected to said light source for providing illumination from said edible article.

2. The food product of claim 1, wherein said edible fiber optic comprises a core and a cladding, wherein said core comprises a first digestible material comprising a first index of refraction and wherein said cladding comprises a second digestible material comprising a second index of refraction, wherein said second index of refraction is less than said first index of refraction.

3. The food product of claim 2, wherein said edible fiber optic comprises a core having a digestible material comprising an index that is greater than the index of refraction of said edible article.

4. The food product of claim 2, wherein said core comprises sugar-gum candy and wherein said cladding comprises a coating of a less dense sugar.

5. The food product of claim 2, wherein said core comprises sugar and wherein said cladding comprises oil.

6. The food product of claim 5, wherein said oil comprises a dopant to alter the index of refraction of said oil.

7. The food product of claim 5, wherein said oil is selected from the group consisting of paraffin oil, polyunsaturated oils, linseed oil, sunflower oil, soybean oil, corn oil, cottonseed oil, sesame oil, rapeseed oil, saccharin oil, soy sauce oil, peanut oil, olive oil, almond oil, castor oil, coconut oil, palm oil, sardine oil and cod-liver oil.

8. The food product of claim 2, wherein said core comprises sugar and wherein said cladding comprises material selected from the group consisting of vegetable wax, bees wax, beef-tallow, beef fat, commercial lard, margarine and butter.

9. The food product of claim 2, wherein said core comprises sugar and wherein said cladding comprises sugar solution at 80% in water.

10. The food product of claim 2, wherein said core comprises sodium chloride and wherein said cladding comprises sugar.

11. The food product of claim 1, wherein said light source is selected from the group consisting of a light emitting diode, an incandescent lamp, a thin-film organic polymer light source and a mirror for introducing an environmental light source into said at least one fiber optic.

12. The food product of claim 1, wherein said power source comprises a battery.

13. The food product of claim 12, wherein said battery is selected from the group consisting of a zinc battery, a lemon battery and a watch battery.

14. The food product of claim 1, wherein said edible article comprises a confectionery product.

15. The food product of claim 14, wherein said confectionary product is selected from a group consisting of a lollipop, a frozen confection, spaghetti candy, a pie and a cake.

16. The food product of claim 1, further comprising a central processing unit (CPU) powered by said power source, wherein said CPU controls said light source.

17. The food product of claim 15, wherein said lollipop comprises at least one edible object encased therein and operatively connected to said at least one fiber optic, wherein said light source will illuminate said at least one edible object.

18. The food product of claim 1, further comprising a base having means for rotating said edible article, wherein said base contains said light source and said power source.

19. The food product of claim 1, further comprising a plurality of fusiform or flat images embedded within an edible casing, wherein said plurality of fusiform or flat images are operatively connected to said at least one fiber optic.

20. The food product of claim 16, further comprising a plurality of fusiform or flat images embedded within an edible casing, wherein said plurality of fusiform or flat images are operatively connected to said at least one fiber optic, wherein said CPU comprises means for controllably lighting said images.

21. The food product of claim 2, wherein said core comprises a material state selected from the group consisting of liquid and gel state and wherein said cladding comprises a material state selected from the group consisting of solid, liquid, oil and gel.

22. An edible fiber optic, comprising:
   an edible core; and
   an edible cladding surrounding and affixed to said edible core, wherein said core and said cladding together form an edible fiber optic.

23. The edible fiber optic of claim 22, wherein said edible core comprises material selected from the group consisting of wax, carbohydrate, monosaccharide, disaccharides, polysaccharides and mucopolysaccharide.

24. The edible fiber optic of claim 22, wherein said edible cladding comprises material selected from the group consisting of wax, carbohydrate, monosaccharide, disaccharides, polysaccharides and mucopolysaccharide.

25. A method of making an edible fiber optic, comprising:
   heating and mixing a volume of 2.5 parts granulated sugar, 0.5 parts light corn oil and 0.5 parts distilled water all at 125 degrees Centigrade until mixed into a clear, viscous material;
   refluxing the water away to produce a candy mixture;
   cooling said candy mixture;
   directing said candy mixture under mild pressure through an orifice or spinnerets to produce an optical rod; and
   covering said optical rod with an edible cladding material.

* * * * *